United States Patent [19]

Litvan et al.

[11] 4,082,562

[45] Apr. 4, 1978

[54] POROUS PARTICLES IN FROST-RESISTANT CEMENTITIOUS MATERIALS

[75] Inventors: Gerhard G. Litvan; Peter J. Sereda, both of Ottawa, Canada

[73] Assignee: Canadian Patents and Development Limited, Ottawa, Canada

[21] Appl. No.: 741,792

[22] Filed: Nov. 15, 1976

[30] Foreign Application Priority Data

Dec. 4, 1975 Canada .................................. 241032

[51] Int. Cl.² ............................................. C04B 7/02
[52] U.S. Cl. ......................................... 106/97; 106/98
[58] Field of Search .................................... 106/97, 98

[56] References Cited

U.S. PATENT DOCUMENTS

| 3,640,511 | 2/1972  | Dils .............................. | 106/97 |
| 3,650,784 | 3/1972  | Albert et al. ................. | 106/97 |
| 3,847,633 | 11/1974 | Race ............................ | 106/97 |
| 3,890,157 | 6/1975  | Babcock ....................... | 106/97 |
| 3,972,723 | 8/1976  | Balle et al. ................... | 106/97 |

*Primary Examiner*—J. Poer
*Attorney, Agent, or Firm*—Richard J. Hicks; Stanley E. Johnson

[57] ABSTRACT

A method of producing freeze-thaw resistant cementitious porous materials, such as concrete, mortar, stucco, in which up to about 30% by weight of the cement of a porous particulate material is mixed into the material. The particulate material may be finely divided fired clay, brick, diatomaceous earth or other mineral particles having a size range of 20–50 Tyler mesh, a total porosity of at least 30% and a pore size in the range 0.05 to 3.0 microns.

12 Claims, 1 Drawing Figure

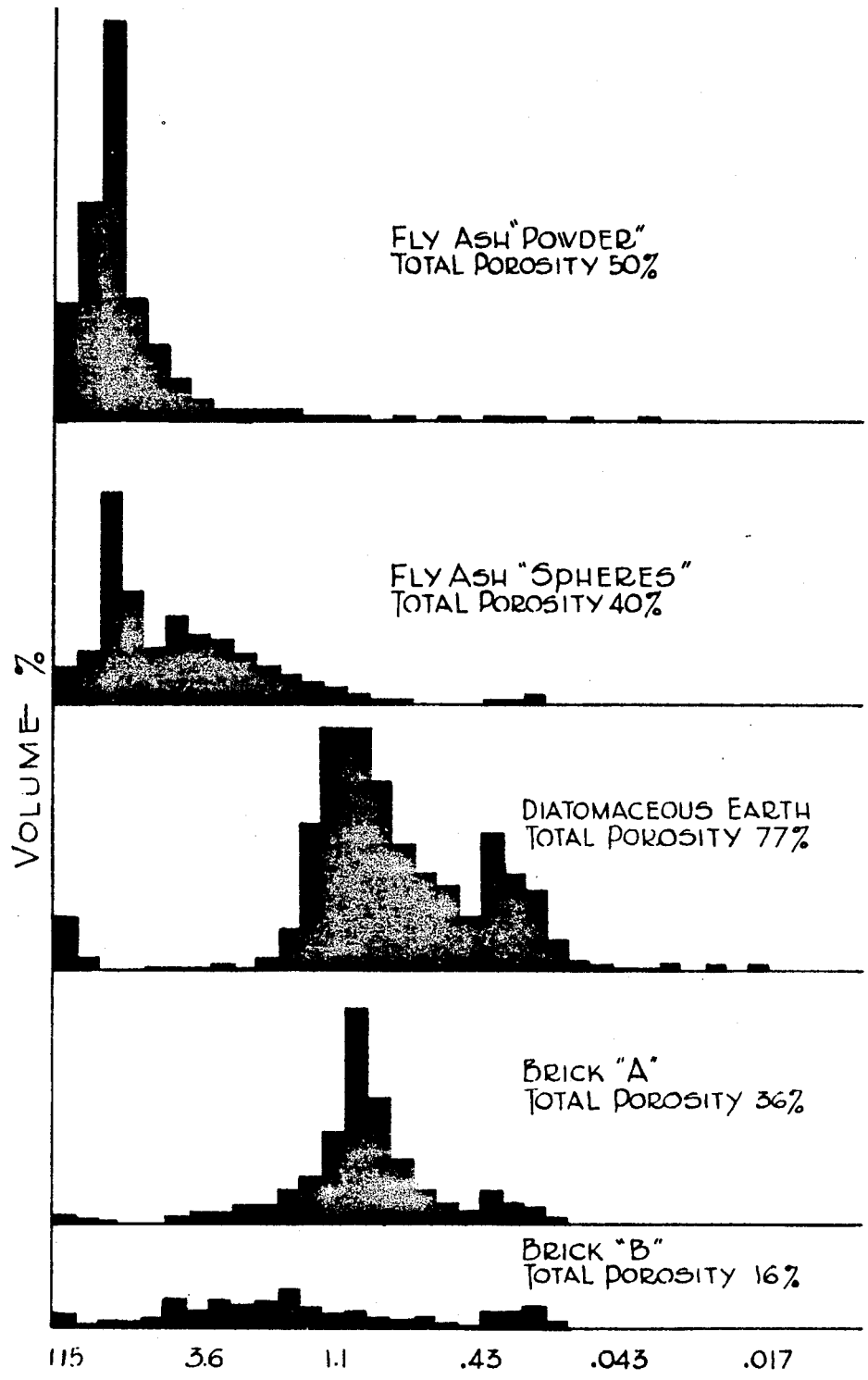

POROUS PARTICLES IN FROST-RESISTANT CEMENTITIOUS MATERIALS

This invention relates to frost-resistant concrete and other cementitious materials and to methods for producing the same.

It is well known that all porous building materials, and in particular the cement paste component in concrete, are susceptible to degradation by the freeze-thaw cycles to which they are frequently subjected, especially when the pores therein are of certain known size and when they are completely saturated with water. The damage is particularly severe in the presence of de-icing salts. It is also known that such degradation can be minimized, if not eliminated, by air entrainment in the concrete so as to provide voids of the order of 0.001 to 0.01 inches separated by not more than 0.010 inches. It is fair to state that where frost damage has occurred it can be attributed to the failure to provide proper air entrainment.

Air entrainment is normally effected by the addition of a surface active agent to the concrete mix. A large number of small air bubbles are formed during mixing and are captured by the plastic concrete to remain as voids on hardening of the concrete. Frost resistance is attained when the aforesaid number, size and distribution of voids is produced. Difficulties remain however in the consistent production of the required voids for various reasons which include inconsistencies in the nature and concentration of the air entraining admixture, the nature and proportions of the constituents of the concrete mixture, the type and duration of mixing employed, consistency, particularly the water to cement ratio and the sand to cement ratio, and lastly but most importantly the kind and degree of compaction applied in placing the concrete. It will be appreciated that modern techniques and controls applied at a ready-mix concrete plant generally assure good quality concrete for delivery to a job site. However, on site controls are not easily enforced and it is believed that "overfinishing" of concrete causes most of the frost-degradation problem. Excessive trowelling of the placed concrete to produce a smooth surface destroys the entrained air bubbles by drawing them to the surface or by mechanical action. At the same time it is the external surface which is the most vulnerable to freeze-thaw action and is exposed to most damaging conditions imposed by de-icing salts, with the result that the surface frequently spalls off. It will also be appreciated that the prior art system is only possible at certain water-cement ratios and in particular is impossible at the high water-cement ratios often encountered in stucco-type applications. In stucco applications, the surface of the material is frequently heavily worked which completely destroys the fragile entrained air bubbles produced by the prior art process.

This invention is intended to cover concrete, stucco, mortar and other cementitious materials. However, for simplicity, this specification will refer hereinafter only to concrete, which is intended to be equally applicable to the aforesaid stucco, mortar and other cementitious materials.

It is an object of the present invention, therefore, to provide a method of producing a concrete having the required internal porosity and pore size to overcome the freeze-thaw spalling problem.

It is another object of the invention to provide a novel concrete mix which, when cured, is relatively immune to frost-degradation and the de-icing salt spalling.

We have found that the objects of the present invention can be achieved by the incorporation of solid particles having a large internal porosity and suitable pore sizes to act in a fashion similar to that of an air void.

Thus, by one aspect of this invention, there is provided in a method of producing a frost-resistant concrete and other cementitious materials the improvement comprising mixing an effective amount up to 30% by weight of cement of a particulate porous material in the size range of about 290 to 850 microns, having a total porosity of at least 30% and a pore size distribution in the range of 0.05 to 3 microns into said materials.

By another aspect of this invention there is provided a frost-resistant cementitious material which includes an effective amount up to about 30% by weight of a particulate porous material in the range of about 290 to about 850 microns having a total porosity of at least 30% and a pore size distribution in the range of 0.05 to 3 microns.

By the incorporation of particulate porous materials, having intercommunicating pores, a precisely determined amount of air void space can be mixed into the concrete, or cement paste, with considerable certainty. The distribution of these air voids can be uniform or, if desired, they can be concentrated at the area of greatest vulnerability, e.g. in the surface region of a paving slab. Further, these voids are indestructible and can be incorporated in amounts in excess of 6% (the present upper limit for air entrainment based on strength requirements) without reducing the strength of the concrete. This limit need not apply to the addition of porous particles because they have integrity or strength themselves. The particles can even be incorporated into pressed concrete products to produce a product which has heretofore been impossible because the air bubbles of the prior art were destroyed during the pressing operation. The ability to provide frost resistance in pressed concrete products expands the applicability of this process to many additional products not heretofore possible.

The invention will be described in more detail hereinafter by reference to the accompanying examples and to drawings in which sole FIGURE 1 is a block diagram illustrating pore size distribution of various particulate materials incorporated into a cement paste.

Materials which are suitable for incorporation into cement paste, stucco, mortar or concrete mixtures for effective elimination of freeze-thaw degradation must be compatible with the concrete mixture and should have a relatively large total (vol) porosity (at least about 30%) and a pore size distribution in the range of about 3 to about 0.05 microns and preferably 1 to about 0.1 microns. Many mineral materials have been examined including diatomaceous earth, powdered brick and fly ash particles produced by spherical agglomeration or high temperature sintering of powder. Other materials which are also under consideration include:

amorphous silica
refractory waste
perlite
expanded clays and shales
expanded slags
Fuller's earth
pumice vermiculite The pore size distribution of some of these materials is shown diagrammatically in FIG. 1 (as measured by mercury intrusion porosimeter). It will be noted that although the total porosity of the fly ash particles is acceptable, the pore size is generally outside the effective range. It is visualized, however, that composite particles composed of fly ash and lime may be suitable. While the total porosity of brick particles is generally considerably lower than either fly ash or diatomaceous earth, the pore size range of the particles is particularly favourable. Brick A is generally superior, as described in more detail hereinafter, to Brick B as a larger percentage of the pores is within the desired range and the total porosity is also greater. The particle size range for effective incorporation into the concrete or cement paste mix is generally between 20 and 50 Tyler mesh (841–297 microns).

EXAMPLE 1

6 inches × 1 inch × 1 inch cement paste prisms containing 50% and 70% water by weight of cement, (W/C 0.5 and 0.7) and varying amounts of various particulate materials as set forth in Table 1 hereinbelow were prepared for cyclic freeze-thaw testing by the method of ASTM C-666. Extent of deterioration was monitored by the method of residual length change and cycling was continued until total destruction was achieved or the prism was judged non-susceptible to freeze-thaw degradation.

ash particles, which is illustrated in FIG. 1 as being considerably greater than for other materials.

Significant improvement was achieved with even an addition of Brick A in an amount of 10% by weight of cement or diatomaceous earth in an amount of 2.6% by weight of cement (10% by vol. of cement), and prisms containing 16% or higher weight or volume concentrations, respectively, suffered no detectable change after having been cycled more than 1,000 times. Brick B was not as effective as Brick A as the performance of the latter at the 16% level is equalled by the former only at the 28% level, and here again the reason is believed to reside in the pore size distribution, as illustrated in FIG. 1, and in total porosity. Brick B had a total porosity of only 16% as compared to 36% for Brick A. Brick A particles were produced by crushing buff-coloured limey-clay type commercially produced house brick (produced by Diamond Brick Co. Ltd.). Brick B particles were produced by crushing red pure clay type commercially produced house brick (produced by DomTar Construction Materials Ltd.).

From Table 1 and FIGURE 1 it is believed clear that diatomaceous earth in an amount between 2 and 5% by weight of cement, and fired clay particles, especially ground brick particles, in an amount between 12 and 20% by weight of cement are particularly advantageous within the general range up to about 30% by weight of cement. As little as about 1% of diatomaceous earth and as much as about 28% of fired clay particles have been found generally effective.

TABLE I
CYCLES TO CAUSE DETERIORATION
(All Proportions are by Weight)

| Cement Prop'n | Water Prop'n | Prop'n | Type | Additive Size in mm | | | | |
|---|---|---|---|---|---|---|---|---|
| | | | | .15–.30 | .30–.42 | .42–.59 | .59–.85 | .83–1.0 |
| 1 | .5 | .09 | Brick | | 300 | <100 | <150 | <100 |
| 1 | .5 | .16 | "A" | >1000 | >1000 | >1000 | >1000 | >1000 |
| 1 | .5 | .28 | | | | >1000 | >1000 | |
| 1 | .5 | .09 | Brick | | | <100 | <50 | |
| 1 | .5 | .16 | "B" | <50 | <100 | <150 | <400 | 50 |
| 1 | .5 | .28 | | | | >1000 | >450 | |
| 1 | .5 | .026 | Diatomaceous | | | >1000 | <150 | |
| 1 | .5 | .036 | Earth | | | | | <50 |
| 1 | .5 | .036 | Sand | | <25 | | | <50 |

| | | | | Size in mm | | | |
|---|---|---|---|---|---|---|---|
| | | | | .20–.30 | .30–.40 | .40–.50 | .50–1 |
| 1 | .5 | .09 | Fly Ash | | | | |
| 1 | .5 | .16 | (Spheres) | <25 | <50 | | |
| 1 | .5 | .09 | Fly Ash | <50 | <50 | <25 | |
| 1 | .5 | .16 | (Particles) | 50 | 25 | | |
| 1 | .7 | .09 | Fly Ash | | | | |
| | | | (Spheres) | <25 | <25 | | <25 |
| 1 | .7 | .16 | | <25 | | <25 | <25 |
| 1 | .7 | .09 | Fly Ash | <25 | <25 | | |
| 1 | .7 | .16 | (Particles) | <25 | <25 | <25 | |
| 1 | .5 | 0 | | | 50 | | |
| 1 | .7 | 0 | | | <25 | | |

It will be seen that cement prisms without particulate additives (neat cement) survived an average of less than 50 cycles and that addition of sand in an amount of 16% by weight of the cement did not increase the freeze-thaw resistance at all. Similarly, fly ash particles, obtained from powder either by spherical agglomeration (spheres) or high temperature sintering at 900° C and crushing (particles) only improved the freeze-thaw resistance marginally, if at all, and the reason for this is believed to reside in the pore size distribution of the fly

EXAMPLE 2

The procedures of Example 1 were repeated using concrete instead of neat cement and mortar mixes. The composition of the mix was one part cement, 0.58 part water, 2.25 parts sand, 2.75 parts aggregate and 0.022 part diatomaceous earth (as measured by weight). The fabricated bars were of the dimensions of 7.5 (3) by 7.5 (3) by 30.4 (12) cm (in) and were fitted with studs for the measurement of length changes. For the purpose of comparison, two bars were fabricated of the above mix but without the addition of diatomaceous earth. The size of the particles was between 840 and 297 μ. The specimens were subjected to alternate freeze-thaw cycling according to ASTM test procedure C666 and their performance evaluated from residual length changes, Δ 1/1, and decrease of elastic modulus, E/Eo, determined by the resonant frequency methods. The results are given in Table II below.

TABLE II

Residual fractional length changes and decrease of relative dynamic modulus of elasticity of concrete specimens containing diatomaceous earth, as a result of alternate freezing and thawing.

| Number of Cycles | Diatomaceous Earth | | | |
|---|---|---|---|---|
| | with | without | with | without |
| | Δ 1/1, % | | E/Eo | |
| 0 | 0.00,0.00 | 0.00,0.00 | 1.00,1.00 | 1.00,1.00 |
| 10 | 0.00,0.00 | 0.00,0.00 | .95, .95 | .97 .97 |
| 25 | 0.00,0.00 | 0.00,0.00 | .97 .97 | .97 .97 |
| 100 | 0.01,0.01 | 0.03,0.00 | .99 .99 | .92 .92 |
| 200 | 0.03,0.03 | 0.12,0.09 | .98 .97 | .38 .38 |
| 300 | 0.04,0.04 | 0.45,0.39 | .97 .97 | |
| 430 | 0.06,0.07 | 1.31,1.63 | | |

EXAMPLE 3

In a further series of tests, specimens were fabricated from the above described mix with reference to Example 2 but instead of diatomaceous earth, brick (Diamond 297–840μ in size) particles were used. The performance of the specimens was compared to that of air entrained concrete (Darex 1 ml/1520 g cement) and that of plain concrete and the results are set forth in Table III.

TABLE III

Residual length changes of concrete specimens as function of the number of freezing-and-thawing cycles.

| Sample | Δ 1/1, % | | |
|---|---|---|---|
| | 50 Cycles | 160 Cycles | 360 Cycles |
| Plain | .117, .103 | .702, .478 | 1.908, 1.202 |
| 5% brick added | .009, .006 | .015, .018 | .026, .025 |
| 10% brick added | .011, .010 | .018, .034 | .218, .158 |
| 20% brick added | .003, .005 | .012, .015 | .022, .022 |
| Air entrained | .007, .005 | .010, .009 | .025, .019 |

EXAMPLE 4

A series of compressive strength tests were conducted under standard test conditions to demonstrate the detrimental effect of air entraining and the beneficial effect of incorporated particulate matter on compressive strength. The results are tabulated in Table IV below.

TABLE IV

Compressive strength of concrete cylinders plain, air entrained and containing brick particulate matter.

| Sample | Compressive Strength kPa (lbs/sq in) | |
|---|---|---|
| Plain | 24,408 (3540) | 25,925 (3760) |
| Air entrained | 24,063 (3490) | 21,236 (3080) |
| 5% brick | 26,821 (3890) | 27,235 (3950) |
| 10% brick | 27,304 (3960) | 27,717 (4020) |
| 20% brick | 28,269 (4100) | 27,304 (3960) |

It is concluded, therefore, that the improvement in freeze-thaw resistance is a function of the size, total porosity and pore size distribution of the additive particulate material and not a characteristic of a particular additive material. Diatomaceous earth, which has the required size, porosity and pore size has been demonstrated to be a very effective additive, and other materials will readily suggest themselves to those skilled in the art. While fly ash particles per se are not particularly effective, composite particles comprising fly ash and lime may be produced having the required porosity and pore size characteristics.

We claim:

1. A method of producing frost-resistant concrete and other cementitious materials comprising:
   (a) selecting a particulate porous material having a selected particle size in the range between 290 and 850 microns, a total porosity of at least 30% and a selected pore size distribution in the range of 0.05 to 3 microns; and
   (b) mixing said particulate porous material into said cementitious material in an effective amount up to 30% by weight of cement so as to produce a frost-resistant material which will withstand at least 300 freeze-thaw cycles as measured by the method of ASTM C-666 without significant change in length or modulus.

2. A method as claimed in claim 1 wherein said particulate porous material is selected from the group consisting of diatomaceous earth, and fired clay particles.

3. A method as claimed in claim 1 wherein the pore size is selected to be in the range 0.1 to 1.0 microns.

4. A method as claimed in claim 2 wherein diatomaceous earth is added in an amount between 2–5% by weight of cement and is selected to have a particle size in the range about 420 to 590 microns.

5. A method as claimed in claim 2 wherein fired clay particles are added in an amount between 12–20% by weight of cement and are selected to have a pore size distribution centered in the range 0.5 to 1.1 microns.

6. A frost-resistant cementitious material which will withstand at least 300 freeze-thaw cycles as measured by the method of ASTM C-666 and which includes an effective amount, up to about 30% by weight of cement, of a particulate porous material having a selected particle size in the range between 290 and 850 microns, a total porosity of at least 30% and a selected pore size distribution in the range of 0.05 to 3 microns.

7. A cementitious material as claimed in claim 6 wherein said particulate porous material is selected from the group consisting of diatomaceous earth, and fired clay particles.

8. A cementitious material as claimed in claim 6 wherein the pore size is selected to be in the range 0.1 to 1.0 microns.

9. A cementitious material as claimed in claim 7 wherein diatomaceous earth is present in an amount between 2 and 5% by weight of cement and is selected to have a particle size in the range about 420 to 590 microns.

10. A cementitious material as claimed in claim 7 wherein fired clay particles are present in an amount between 12 and 20% by weight of cement and are selected to have a pore size distribution centered in the range 0.5 to 1.1 microns.

11. A cementitious material as claimed in claim 10 wherein said fired clay particles are ground brick.

12. A cementitious material as claimed in claim 6 produced from a mixture comprising about 1 part by weight cement, about 0.58 part by weight water, about 2.25 parts by weight sand, about 2.75 parts by weight aggregate and about 0.022 parts by weight diatomaceous earth.

* * * * *